United States Patent
Gosewehr (10) Patent No.: US 7,308,491 B2
(45) Date of Patent: Dec. 11, 2007

(54) SYSTEM AND METHOD FOR ON-LINE UPGRADE OF CALL PROCESSING SOFTWARE USING GROUP SERVICES IN A TELECOMMUNICATION SYSTEM

(75) Inventor: Roy C. Gosewehr, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1101 days.

(21) Appl. No.: 10/174,338

(22) Filed: Jun. 18, 2002

(65) Prior Publication Data

US 2003/0176165 A1 Sep. 18, 2003

Related U.S. Application Data

(63) Continuation-in-part of application No. 10/100,494, filed on Mar. 18, 2002, now abandoned.

(51) Int. Cl.
*G06F 15/177* (2006.01)
*G06F 9/44* (2006.01)

(52) U.S. Cl. .................................. 709/221; 717/168

(58) Field of Classification Search ........ 709/201–203, 709/220–222, 227–229; 717/168
See application file for complete search history.

(56) References Cited

U.S. PATENT DOCUMENTS

| 6,385,770 | B1 * | 5/2002 | Sinander .................. 717/170 |
| 6,917,586 | B1 * | 7/2005 | Mauger et al. ............. 370/230 |
| 6,917,819 | B2 * | 7/2005 | Collins ..................... 455/560 |
| 7,058,082 | B1 * | 6/2006 | Bhat et al. .................. 370/466 |
| 7,076,042 | B1 * | 7/2006 | Praturi et al. ........... 379/201.01 |
| 7,185,061 | B1 * | 2/2007 | Gopal et al. ................ 709/207 |
| 2005/0141550 | A1 * | 6/2005 | Mauger et al. ............. 370/465 |
| 2006/0149994 | A1 * | 7/2006 | Kurapati et al. ............... 714/4 |
| 2007/0041566 | A1 * | 2/2007 | Praturi et al. .......... 379/265.08 |

* cited by examiner

*Primary Examiner*—Andrew Caldwell
*Assistant Examiner*—Douglas Blair (57) ABSTRACT

For use in a switch comprising N call application nodes (CANs), a method of upgrading call process server applications that comprise a primary call process and a backup call process executed on different CANs. The method comprises the steps of: 1) receiving a shutdown command to shutdown a first call process server application comprising a first primary call process executed on a first CAN and a first backup call process executed on a second CAN; 2) disabling the first primary call process such that no future call traffic associated with the first call process server application is directed to the first primary call process; 3) re-designating the first backup call process as the new primary call process of the first call process server application such that all future call traffic associated with pre-existing calls handled by the first call process server application is directed to the re-designated first backup call process; 4) moving a second backup call process, if any, associated with a second call process server application and resident on the first CAN to a different CAN; and 5) installing an upgraded first call process server application on the first CAN, such that an upgraded first primary call process of the upgraded first call process server application executes on the first CAN and creates on the first CAN an upgraded first backup call process.

20 Claims, 8 Drawing Sheets

SYSTEM AND METHOD FOR ON-LINE UPGRADE OF CALL PROCESSING SOFTWARE USING GROUP SERVICES IN A TELECOMMUNICATION SYSTEM

This application is a continuation-in-part (CIP) of U.S. patent application Ser. No. 10/100,494, filed on Mar. 18, 2002, now abandoned.

CROSS-REFERENCE TO RELATED APPLICATIONS

The present invention is related to those disclosed in the following U.S. Non-Provisional patent applications:
1) Ser. No. 10/038,878, filed Dec. 31, 2001, entitled "SYSTEM AND METHOD FOR DISTRIBUTED CALL PROCESSING USING LOAD SHARING GROUPS";
2) Ser. No. 10/039,186, filed Dec. 31, 2001, entitled "SYSTEM AND METHOD FOR DISTRIBUTED CALL PROCESSING USING A DISTRIBUTED TRUNK IDLE LIST";
3) Ser. No. 10/038,872, filed Dec. 31, 2001, entitled "DISTRIBUTED IDENTITY SERVER FOR USE IN A TELECOMMUNICATION SWITCH";
4) Ser. No. 10/038,879, filed Dec. 31, 2001, entitled "SYSTEM AND METHOD FOR PROVIDING A SUBSCRIBER DATABASE USING GROUP SERVICES IN A TELECOMMUNICATION SYSTEM"; and
5) Ser. No. 10/100,494 filed on Mar. 18, 2002, entitled "SYSTEM AND METHOD FOR ON-LINE UPGRADE OF CALL PROCESSING SLOTWARE USING LOAD SHARING GROUPS."

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to any real time or near-real time transaction processing software in telecommunication systems and, more specifically, to a method for performing on-line upgrades of call processing software using group services.

BACKGROUND OF THE INVENTION

Telecommunication service providers continually try to create new markets and to expand existing markets for telecommunication services and equipment. One important way to accomplish this is to improve the performance of existing network equipment while making the equipment cheaper and more reliable. Doing this allows the service providers to reduce infrastructure and operating costs while maintaining or even increasing the capacity of their wireless networks. At the same time, the service providers are attempting to improve the quality of telecommunication services and increase the quantity of services available to the end-user.

A conventional switching center typically contains a large switching fabric controlled by a main processing unit (MPU) that contains a large number of data processors and associated memories, often in the form of ASIC chips. Each of these MPU processors contains a call process client application for controlling the flow of control signals of a single call. Each call process client application in turn communicates with a call process server application that controls the flow of control signals for a large number of calls.

Thus, when a particular event occurs during a phone call (e.g., the call set-up, the invocation of three-way calling, call disconnection, or the like), control signals associated with the event are relayed from the origination station to the call process client application in the switching center. This call processing client application then relays the control signals to the call process server application, which actually performs the call processing service requested by the control signals.

Unfortunately, in large capacity systems, bottlenecks may develop around the call process server applications. Each call process client application must communicate with a particular piece of server hardware that is executing the call process server application. Due to the random nature of the start and stop of phone calls, in large systems, some servers may be near capacity and develop bottlenecks, while other servers still have plenty of adequate bandwidth. Moreover, a system failure in a particular piece of server hardware results in the loss of all call processes being handled by a call process server application being executed on the failed server.

Moreover, upgrading the call process server applications in a conventional switching center without interrupting existing service is extremely complicated. In some prior art systems, performing a software upgrade requires fully redundant (duplex) hardware in the switching center. The redundant components are split into an active side and an inactive side. Complex control software is required to manage the split (by swapping active and inactive sides) and to manage the process of merging the two halves of the system back into a unitary system. The redundant hardware adds excessive cost to the prior art switching center and the complex control software is expensive to develop, susceptible to errors due to its complexity, and difficult to maintain.

Therefore, there is a need for improved telecommunication network equipment and services. In particular, there is a need for switching centers that may easily undergo on-line software upgrades. More particularly, there is a need for switching centers that may be upgraded on-line without requiring the use of redundant hardware and without requiring complex and expensive control software.

SUMMARY OF THE INVENTION

To address the above-discussed deficiencies of the prior art, it is a primary object of the present invention to provide, for use in a switch comprising N call application nodes (CANs), a method of upgrading a plurality of call process server applications, wherein each of the call process server applications comprises a primary call process and a backup call process executed on different ones of the N CANs. According to an advantageous embodiment of the present invention, the method comprising the steps of: 1) receiving a shutdown command operable to upgrade a first call process server application comprising a first primary call process executed on a first CAN and a first backup call process executed on a second CAN; 2) in response to receipt of the shutdown command, disabling the first primary call process such that no future call traffic associated with the first call process server application is directed to the first primary call process on the first CAN; 3) re-designating the first backup call process as a new primary call process of the first call process server application such that all future call traffic associated with pre-existing calls handled by the first call process server application is directed to the re-designated first backup call process on the second CAN without the direct knowledge or involvement of the sending application; 4) moving a second backup call process, if any, associated with a second call process server application and resident on the first CAN to a different CAN; and 5) installing an upgraded first call process server application on the first CAN, such that an upgraded first primary call process of the upgraded first call process server application executes on the first CAN and creates on the first CAN an upgraded first backup call process of the upgraded first call process server application.

According to one embodiment of the present invention, the method comprises the further step of removing the disabled first primary call process from the first CAN.

According to another embodiment of the present invention, the method comprises the further step of preventing future call traffic associated with new calls from being directed to the re-designated first backup call process.

According to still another embodiment of the present invention, the method comprises the further step of removing the re-designated first backup call process from the second CAN when all pre-existing calls are terminated.

According to yet another embodiment of the present invention, the upgraded first primary call process joins a first load sharing group server application comprising call process server applications similar to the upgraded first call process server application.

According to a further embodiment of the present invention, the first load sharing group server application directs new call traffic associated with new calls to the upgraded first primary call process under control of a throttling mechanism.

According to a still further embodiment of the present invention, the throttling mechanism initially causes relatively small amounts of new call traffic to be directed to the upgraded first primary call process.

According to a yet further embodiment of the present invention, the throttling mechanism causes gradually increasing amounts of new call traffic to be directed to the upgraded first primary call process.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunications network.

In the disclosure that follows, a group services framework for performing various distributed call processing functions is implemented in a mobile switching center of a wireless communication network. This is by way of illustration only and should not be construed so as to limit the scope of the invention. Those skilled in the art will understand that the group services framework described below may be implemented in other types of telecommunication network and devices, including many varieties of switches, routers and the like, and including entirely wireline networks that do not contain wireless devices.

Figure 1:
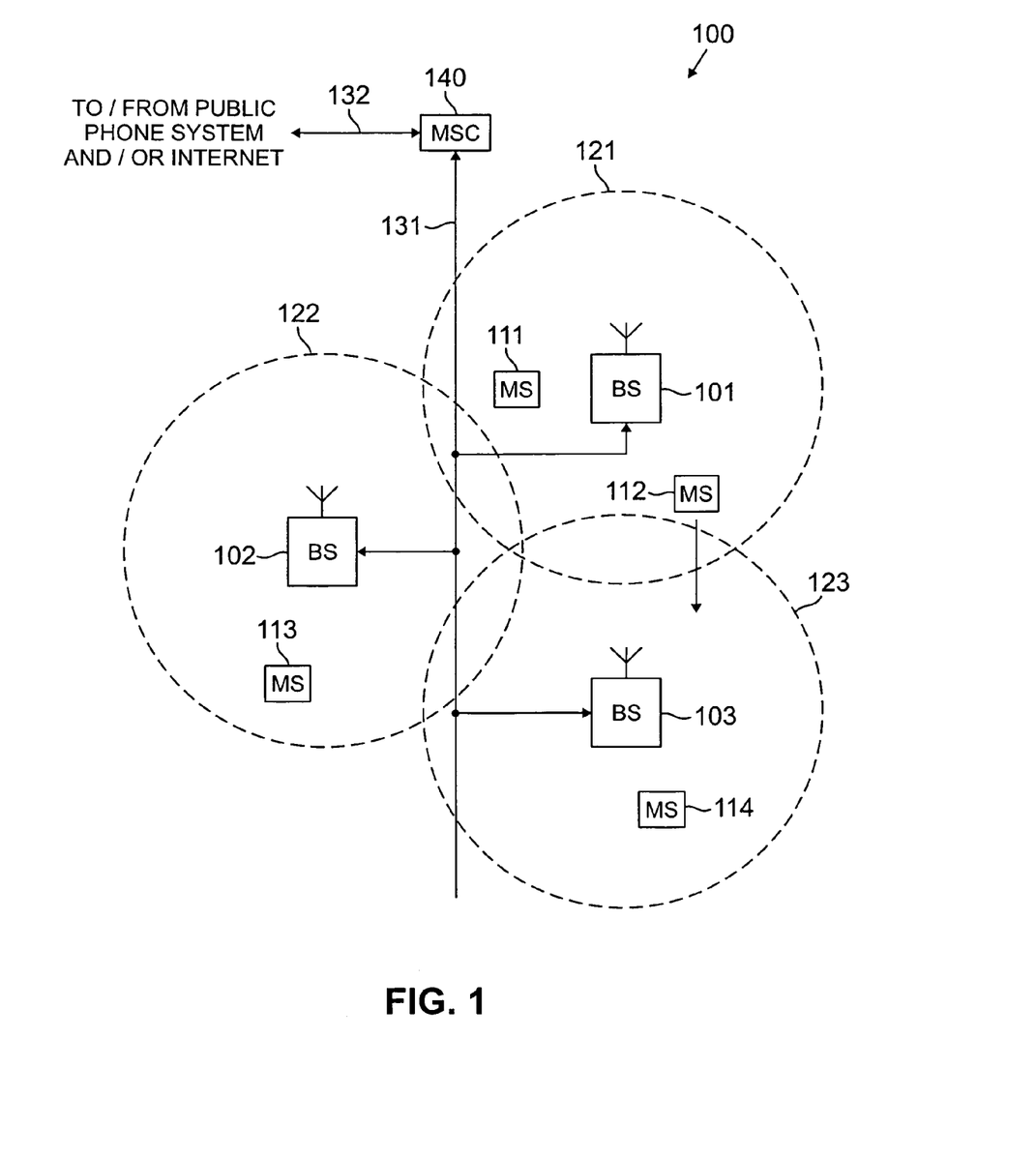
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over, for example, code division multiple access (CDMA) channels. Mobile stations 111-114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication trunk lines 131, mobile switching center (MSC) 140, and communication trunk lines 132. Trunk lines 131 also provide connection paths to transfer control signals between MSC 140 and BS 101, BS 102 and BS 103 that are used to establish connections for voice and data circuits between MSC 140 and BS 101, BS 102 and BS 103 over communication trunk lines 131 and between MSC 140 and the Internet or the PSTN over communication trunk lines 132. In some embodiments of the present invention, communication trunk lines 131 may be several different data links, where each data link couples one of BS 101, BS 102, or BS 103 to MSC 140.

Trunk lines 131 and 132 comprise one or more of any suitable connection means, including a T1 line, a T3 line, a fiber optic link, a network packet data backbone connection, or any other type of data connection. Those skilled in the art will recognize that the connections on trunk lines 131 and 132 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on trunk lines 131 and 132 may provide a transmission path for transmission of analog or digital control signals in a suitable signaling protocol.

Figure 2:
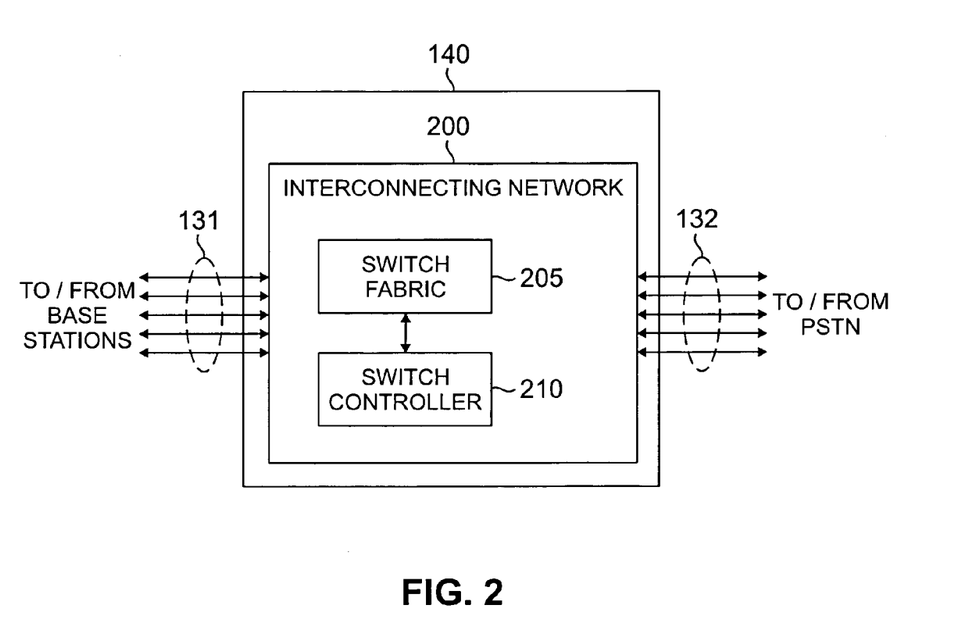
FIG. 2 illustrates an exemplary mobile switching center in greater detail according to one embodiment of the present invention.

FIG. 2 illustrates exemplary mobile switching center 140 in greater detail according to one embodiment of the present invention. MSC 140 includes interconnecting network 200, among other things. Interconnecting network 200 comprises switch fabric 205 and switch controller 210, which together provide switch paths between communication circuits in trunk lines 131 and 132. MSC 140 provides services and coordination between the subscribers in wireless network 100 and external networks, such as the PSTN or Internet. Mobile switching centers similar to MSC 140 are well known to those skilled in the art.

When a wireless network subscriber turns on his or her mobile station (e.g., cell phone) or fixed access terminal, radio messages over the air interface inform the base station that the mobile station (or fixed access terminal) is joining the network. However, a connection is not automatically made to voice or data traffic carrying circuits in trunk lines 131-132. A voice or data traffic connection to the public switched telephone network (PSTN) or the Internet is not needed until the subscriber places a call (e.g., dials a phone number) or accesses the Internet.

However, even when the phone is idle, certain information about the subscriber (i.e., subscriber data) must be retrieved and stored in either the base station or in MSC 140, or both, in order to authenticate the subscriber, gather billing information, identify the services available to the subscriber, determine capabilities of the mobile station, and the like. The control signals (as opposed to voice and data traffic) required to do this are also carried over trunk lines 131 and 132. After the subscriber data is stored in memory in MSC 140, it is available for use by a variety of call processing client (CPC) applications that may be initiated by the subscriber or another device while the mobile station is still active.

For example, when MS 111 is first turned ON, a call process is set up in MSC 140 for MS 111 and subscriber data (e.g., billing information) is stored in MSC 140 that may be accessed by the call process or other call applications that provide particular types of call services. If the subscriber dials a phone number on MS 111 or a call is received from the PSTN directed to MS 111, the call process for MS 111 handles the establishment of a call connection on one of the trunk lines in trunk line 131 and one of the trunk lines in trunk line 132. The MS 111 call process executed in MSC 140 maintains all state information related to the call and to MS 111 and handles all other applications required by MS 111, including three-way calls, voice mail, call disconnection, and the like.

In order to handle a large amount of call traffic, it is necessary to distribute the many active call processes and call service applications handled by MSC 111 across a number of call application nodes. The call services may include application for accessing a subscriber database, selecting (or de-selecting) trunk, lines, retrieving and maintaining call identity information, and the like. The present invention provides methods and apparatuses for distributing call processes and call service applications across multiple call application nodes in a highly reliable and redundant manner. This is accomplished by a distributed network of redundant servers in which call traffic is distributed in order to increase the call-handling capacity of MSC 140. The redundancy of the distributed servers is transparent to both the call process client applications that require a service and the call process server applications that provide the service. It also decreases the complexity of both the client and server applications.

Figure 3:
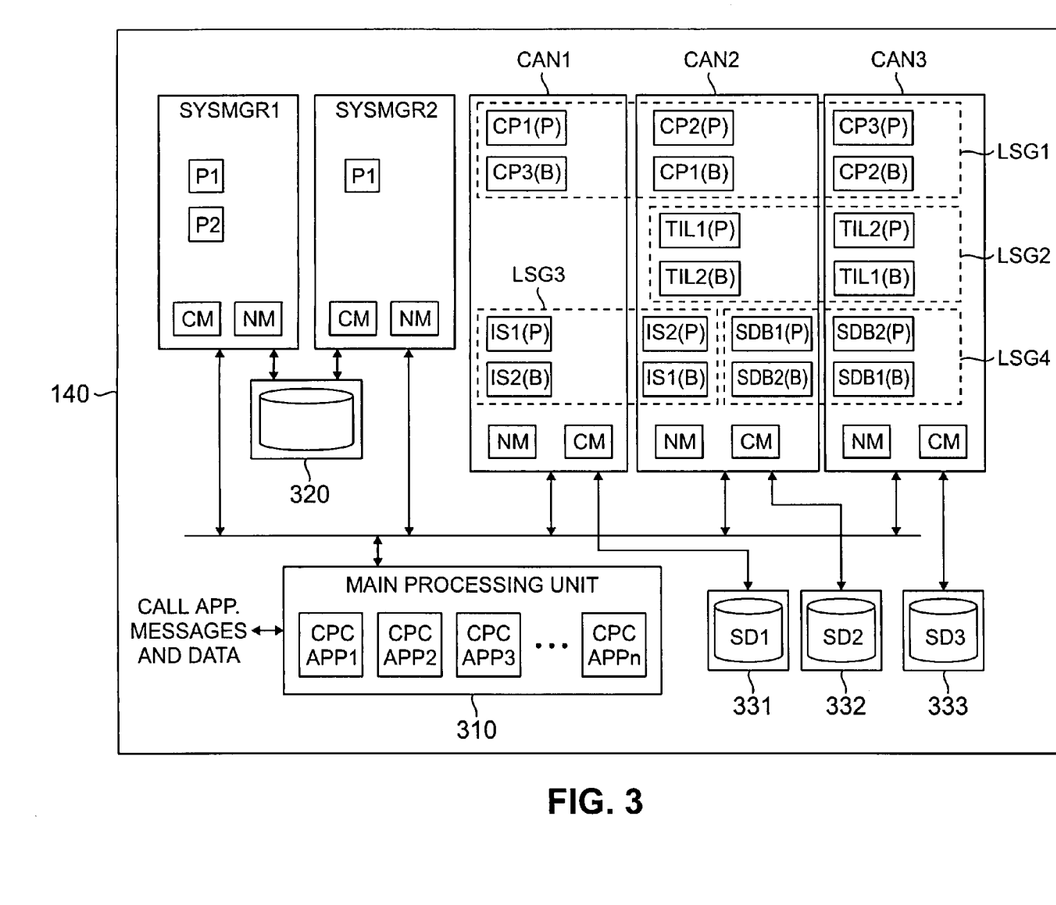
FIG. 3 illustrates selected portions of a mobile switching center that perform distributed call processing using group services according to the principles of the present invention.

FIG. 3 illustrates in greater detail selected portions of exemplary mobile switching center 140 that perform distributed call processing using group services in accordance with the principles of the present invention. MSC 140 comprises main processing unit (MPU) 310, system manager node 1 (SYSMGR1), optional system manager node 2 (SYSMGR2), and master database 320. MSC 140 also comprises a plurality of call application nodes (CANs), including CAN1, CAN2, and CAN3, and a plurality of local storage devices (SDs), namely SD1, SD2, and SD3, that are associated with CAN1, CAN2 and CAN3. Master database 320 may be used as a master software repository to store databases, software images, server statistics, log-in data, and the like. SD1-SD3 may be used to store local capsules, transient data, and the like.

The system manager nodes 1 and 2, collectively, and CAN1-CAN3 execute a configuration management (CM) process that sets up each node with the appropriate software and configuration data upon initial start-up or after a reboot. Every node in the system also executes a node monitor (NM) process that loads software and tracks processes to determine if any process has failed. System manager nodes 1 and 2 execute a first arbitrary process, P1, and system manager node 1 also executes a second arbitrary process, P2.

In accordance with the principles of the present invention, call application nodes 1-3 (CAN1-CAN3) execute a number of call process (CP) server applications organized as primary and backup processes that are available as distributed group services to 1 to N call process client (CPC) applications, namely CPC APP1-CPC APPn in main processing unit 310. The N call application nodes (e.g., CAN1-CAN3) are separate computing nodes comprising a processor and memory that provide scalability and redundancy by the simple addition of more call application nodes.

Each of the N call process client (CPC) applications, namely CPC APP1-CPC APPn in MPU 310 handles the control signals and messages related to a single call associated with a mobile station. Each of CPC APP1-CPC APPn establishes a session with a load sharing group, which assigns the call to a particular one of the primary-backup group call process server applications, CP1, CP2, or CP3. The selected call process server application actually performs the call process services/functions requested by the call process client application.

In the illustrated embodiment, three exemplary call process server applications are being executed, namely CP1, CP2, and CP3. Each of these processes exists as a primary-backup group. Thus, CP1 exists as a primary process, CP1(P), and a backup process, CP1(B). Similarly, CP2 exists as a primary process, CP2(P), and a backup process, CP2(B), and CP3 exists as a primary process, CP3(P), and a backup process, CP3(B). In the illustrated embodiment, CP1(P) and CP1(B) reside on different call application nodes (i.e., CAN1 and CAN2). This is not a strict requirement: CP1(P) and CP1(B) may reside on the same call application node (e.g., CAN1) and still provide reliability and redundancy for software failures of the primary process, CP1(P). However, in a preferred embodiment of the present invention, the primary process and the backup process reside on different call application nodes, thereby providing hardware redundancy as well as software redundancy. Thus, CP1(P) and CP1(B) reside on CAN1 and CAN2, CP2(P) and CP2(B) reside on CAN2 and CAN3, and CP3(P) and CP3 (B) reside on CAN3 and CAN1.

Together, CP1, CP2 and CP3 form a supergroup for load sharing purposes. Thus, CP1(P) and CP1(B), CP2(P) and CP2(B), and CP3(P) and CP3(B) are part of a first load sharing group (LSG1), indicated by the dotted line boundary. Additionally, CAN1-CAN3 host three other load sharing groups, namely, LSG2, LSG3, and LSG4. LSG2 comprises two trunk idle list (TIL) server applications, namely TIL1 and TIL2. TIL1 exists as a primary process, TIL1(P), on CAN2 and a backup process, TIL1(B), on CAN3. TIL2 exists as a primary process, TIL2(P), on CAN3 and a backup process, TIL2(B), on CAN2. Similarly, LSG3 comprises two identity server (IS) applications, namely IS1 and IS2. IS1 exists as a primary process, IS1(P), on CAN1 and a backup process, IS1(B), on CAN2 and IS2 exists as a primary process, IS2(P), on CAN2 and a backup process, IS2(B), on CAN1. Finally, LSG4 comprises two subscriber database (SDB) server applications, namely SDB1 and SDB2. SDB1 exists as a primary process, SDB1(P), on CAN2 and a backup process, SDB1(B), on CAN3 and SDB2 exists as a primary process, SDB2(P), on CAN3 and a backup process, SDB2(B), on CAN2.

A group service provides a framework for organizing a group of distributed software objects in a computing network. Each software object provides a service. In addition, the group service framework provides enhanced behavior for determining group membership, deciding what actions to take in the presence of faults, and controlling unicast, multicast, and groupcast communications between members and clients for the group. A group utilizes a policy to enhance the behavior of the services provided by the group. Some of these policies include primary-backup for high service availability and load sharing for distributing the loading of services within a network.

Call process server applications, such as CP1-CP3, IS1-IS2, and TIL1-TIL2, located within a computing network provide services that are invoked by client applications, such as CPC APP1-CPC APPn. As shown in FIG. 3, the call process server applications are organized into primary-backup groups configured as a 1+1 type of primary-backup group. There are multiple numbers of these primary-backup groups and the exact number is scalable according to the number of processes and/or computing nodes (CANs) that are used. All of the primary-backup groups are themselves a member of a single load sharing group (e.g., LSG1, LSG2, LSG3, LSG4).

It is important to note that while the call process client applications, CPC APP1-CPC APPn, are clients with respect to the call process server applications, CP1, CP2, and CP3, a server application may be a client with respect to another server application. In particular, the call process server applications CP1-CP3 may be clients with respect to the trunk idle list server applications, TIL1 and TIL2, the subscriber database server applications, SDB1 and SDB2, and the identity server applications, IS1 and IS2.

A client application establishes an interface to the load sharing group. When a new call indication is received by the client application, the client application establishes a session with the load sharing group according to a client-side load sharing policy. The initial server (CP1, CP2, etc.) selection policy is CPU utilization-based (i.e., based on the processor load in each of the candidate CANs, with more lightly loaded groups selected first), but other algorithmic policies, such as round-robin (i.e., distribution of new calls in sequential order to each CAN) may be used.

The client application associates the session with the new call and sends messages associated with the call over the session object. The client application also receives messages from the primary-backup group via the session established with the primary-backup group. Only the primary process (e.g., CP1(P)) of the primary-backup group joins the load sharing group (e.g., LSG1).

For a variety of reasons, the application containing the primary may be removed from service. With the removal of the primary member, the backup member becomes the primary and the server application is no longer a member of the load sharing group. However, the client application(s) still maintain their session with the primary-backup group for existing calls. New calls are not distributed to the primary-backup group if it is not a member of the load sharing group.

If the primary of the primary-backup group that is a member of the load sharing group should fail, the backup member is informed that the primary member has failed (or left) and then assumes the role of primary member. The responsibility for these actions must be performed by the server application. It is the responsibility of the Group Service to inform the backup member that the primary member has failed or left.

As part of an online software upgrade process, one or more applications containing primary-backup groups may be removed from service, brought down, and then brought back up using a new version of software code. These groups, if their interface has not changed, join the existing load sharing group. When first started, it is required that the client interface be capable of throttling the call traffic to specific primary-backup groups. The traffic throttling is expressed as a percentage varying from 0% (no calls) to 100%. All new calls that would have been scheduled according to the scheduling algorithm are handled by this session. The throttling factor is initialized to 100% for any primary-backup group that joins the load sharing group. During on-line software upgrades, the throttling factor is adjusted to start with the no-calls case for the new software version. Any client application for the load sharing group may establish a session with a specific primary-backup group. The client may then change the throttling factor at any time. When the throttling factor is changed, all client session interfaces receive via multicast the changed throttling factor. As the throttling factor is increased, the call process server applications with the new software version may receive increasing amounts of call traffic.

Call processing communications from the client applications to the call processing server primary-backup groups must support a very high volume of calls. The group software utilizes an internal transport consisting of a multicasting protocol (simple IP multicast) and optionally a unicasting protocol. The unicasting protocol may be TCP/IP, SCTP, or other transport protocol. The multicast protocol is used for internal member communications relating to membership, state changes, and fault detection. In the absence of unicast transport, the multicast protocol is used for client/server communication streams. The unicast protocol, when provided, is used to provide a high-speed stream between clients and servers. The stream is always directed to the primary of a primary-backup group, which is transparent to both the call processing client application and the call process (e.g., CP1, CP2, CP3, TIL1, TIL2, IS1, IS2).

AS noted above, the call processes on the call application nodes (CANs) are organized into a load sharing group. Each call process (e.g., CP1, CP2, CP3, TIL1, TIL2, IS1, IS2) is itself a primary-backup group. Both members of the primary-backup group may provide the service but only the primary of the group receives messages and thus actually provides the service. When a member of the group is selected as the primary, it registers one or more interface streams for the group. Each stream is a separate interface for some call processing service.

The call processing client application (e.g., CPC APP1, CPC APP2) in MSC 140 receives a new call indication and uses the group service to select an interface with a call application node (i.e., server) to handle the new call. The call process on each server (CAN) is a member of a load sharing group and a particular call application node (CAN) is selected on a CPU utilization (i.e., load) basis or other algorithmic basis (such as round-robin) from the perspective of the call process client application. For the particular primary-backup group that is selected a session is returned to the call processing client application. When the session is established with the primary-backup call process server group, the call processing client application then opens an interface to a particular member (representing an interface to a primary-backup group) and obtains a session interface. Each call processing server sends a message related to the new call over the session interface. Any subsequent transactions associated with the call are sent over the same session object.

The call process server (i.e., primary-backup group) may asynchronously send messages over the session using one or more of the defined stream interfaces. The primary member of the call processing server group receives the transactions. The backup group member does not receive transactions. The primary group member sends updates to the backup group member. In an exemplary embodiment of the present invention, the primary group member decides when updates are sent to the backup group member. The primary starts sending updates when a call has been answered. Prior to the call being answered, the call is defined as being a transient call. After the call has been answered, the call is defined as being a stable call. The present invention protects stable calls from failures, but not transient calls. However, earlier and more frequent updates from the primary to the backup could also protect transient calls from failures.

If the primary group member should fail, then the backup group member becomes the new primary member. According to the exemplary embodiment of the present invention, all transient call information during the fail-over period (the time between when the primary fails and the backup is changed to be the new primary) can be lost, but all stable call information is maintained by the backup.

Advantageously, the present invention has no limitations on the scalability of the system and the system size is hidden from both and the primary-backup group server applications and call process client applications. The present invention eliminates any single point of failure in the system. Any failure within the system will not affect the system availability and performance.

New call application nodes (CANs) and additional primary-backup group server applications (e.g., CP1, CP2, CP3, TIL1, TIL2, IS1, IS2) may be added dynamically to the load sharing groups and can start servicing new call traffic. Call process client applications are not affected by the additions of new servers. If a server should fail, its backup assumes responsibility for the load. This provides high availability for the servicing of each call and minimizes dropped calls.

Advantageously, the redundant architecture of call application nodes 1-3 (i.e., CAN1-CAN3) and the use of primary-backup group server applications in mobile switching center 140 provides for a unique method for upgrading the call process server applications in MSC 140 without interrupting existing service. According to the principles of the present invention, each primary-backup group server application on each of CAN1-CAN3 may be gracefully shutdown in order to effect a partitioning of a target call application node. The target call application node may then be upgraded to new primary-backup group server application software and the upgraded software may gradually be brought on-line and joined to load sharing groups using a throttling mechanism. Once the upgraded software is tested and fully operational, the process is continually repeated at the next targeted call application node until all call application nodes have been upgraded.

Figure 4:
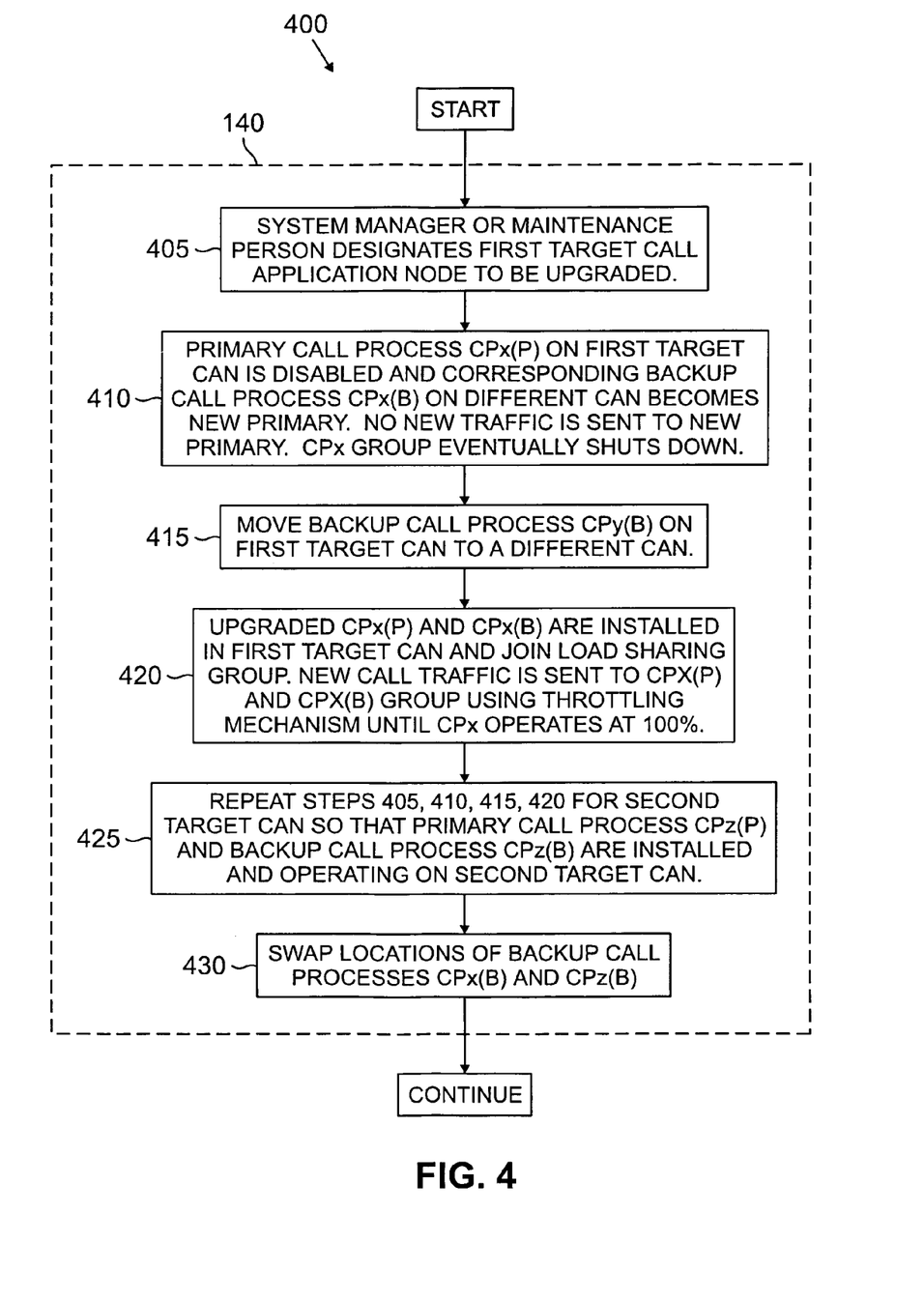
FIG. 4 is a flow diagram illustrating the partitioning and on-line upgrade of call process server applications in a mobile switching center according to the principles of the present invention.

FIG. 4 depicts flow diagram 400, which illustrates the partitioning and on-line upgrade of primary-backup group server applications in mobile switching center 140 in accordance with the principles of the present invention. Initially, system manager node 1 may automatically (or maintenance personnel may manually) designate a first target call application node (e.g., CAN1) to be upgraded (process step 405). Each primary call process Cpx(P) of a primary-backup group call process server application on the first target call application node is disabled and the corresponding backup call process CPx(B) on a different call application node (e.g., CAN2) becomes the new primary call process. At this point, the new primary call process runs without a backup process. However, no call new traffic is sent to the new primary call process. Thus, the CPx primary-backup group eventually shuts down as existing calls disconnect (process step 410).

Since the first target call application node may host one or more backup call processes related to primary call processes executed on other call application nodes, the present invention next moves all backup call processes CPy(B) on the first target call application node to different call application nodes (process step 415). The first target call application node is now free of all primary and backup call processes. The first target call application node is now a new partition and the remaining call applications are part of the old partition.

Next, the upgraded software for the primary call process CPx(P)* is installed and the backup call process CPx(B)* is created in the first target call application node. This new primary-backup group call process server application then joins the appropriate load sharing group (i.e., LSG1). At this point, the new primary server application is receiving no traffic. Thereafter, increasing amounts of new call traffic are sent to the upgraded primary call process Cpx(P)* using a throttling mechanism controlled by the craftsperson (or algorithmically by the system manager) until upgraded primary-backup group Cpx* operates at 100% (process step 420).

Thereafter, steps 405, 410, 415, 420 are repeated for a second target call application node (e.g., CAN2) so that an upgraded primary call process CPz(P)* and an upgraded backup call process CPz(B)* are installed (or created) and operating on the second target call application node (process step 425). The second call target call application node is now part of the new partition, along with the first target call application node.

Finally, the managing software application swaps the locations of the backup call processes CPx(B)* and Cpz(B)* so that the primary and backup call processes are not running on the same call application nodes (process step 430). The upgrade process then continues on to other call application nodes until all remaining call application nodes have joined the new partition and the old partition (containing the old software) ceases to exist.

FIGS. 5A-5K are a sequence of views of the call application nodes in exemplary mobile switching center (MSC) 140 as the call application nodes undergo the partitioning and on-line upgrade process illustrated in FIG. 4.

Figure 5A:
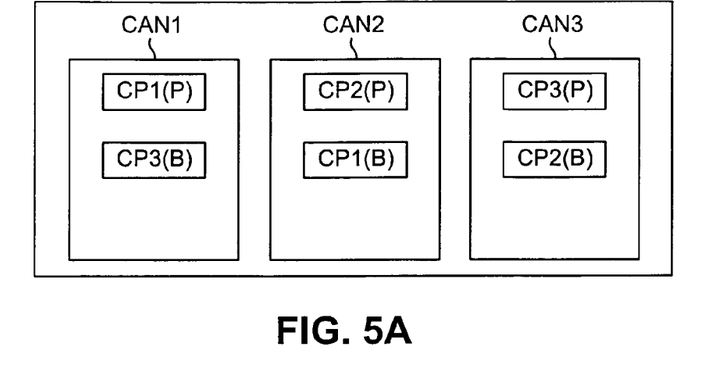
FIGS. 5A-5K are a sequence of views of the call application nodes in the exemplary mobile switching center (MSC) as the call application nodes undergo the partitioning and on-line upgrade process illustrated in FIG. 4.

FIG. 5A illustrates the initial view of CAN1-CAN3 in mobile switching center 140.

Figure 5B:
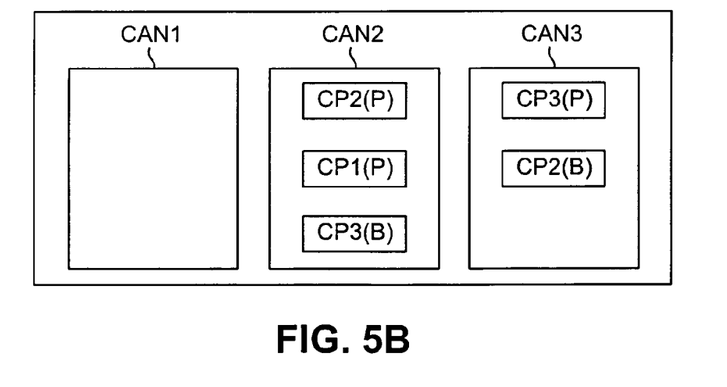

In FIG. 5B, primary call process CP1(P) in CAN1 has be terminated and the related backup call process CP1(B) in CAN2 has become the new primary call process CP1(P). No new traffic is directed to CP1(P) in CAN2. Also, the backup call process CP3(B) has been moved to CAN2.

Figure 5C:
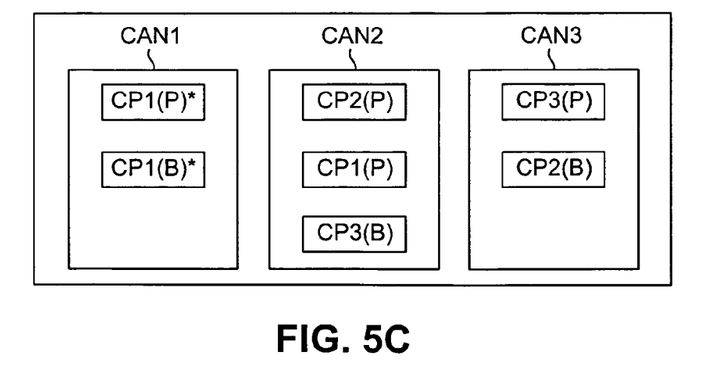

In FIG. 5C, new updated primary call process CP1(P)* has been installed in CAN1 and new updated backup call process CP1(B)* has been created in CAN1. New call traffic can now be directed to primary call process CP1(P)* in increasing increments until new updated primary-backup group call process server application CP1* is fully functional.

Figure 5D:
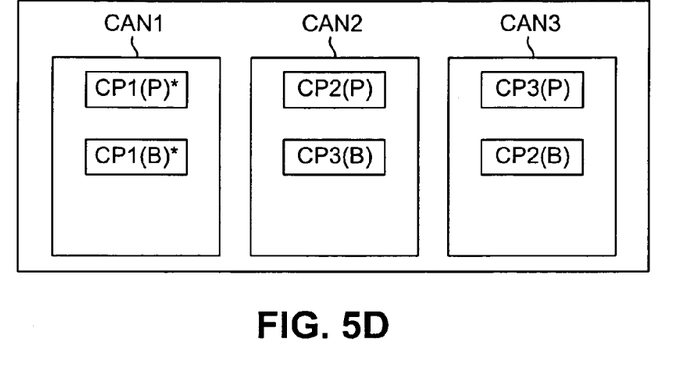

In FIG. 5D, the old call process CP1(P) in CAN2 has finally shut down through termination of all existing calls.

Figure 5E:
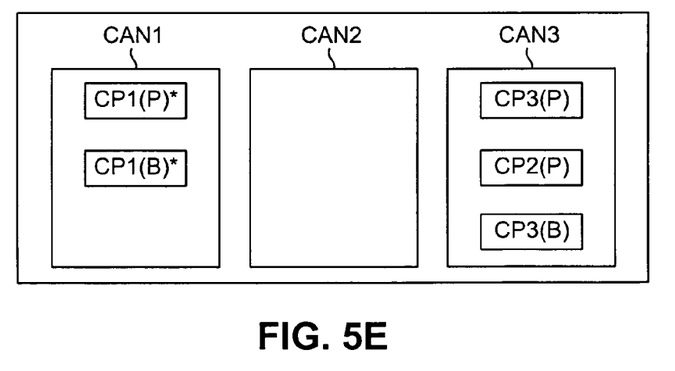

In FIG. 5E, primary call process CP2(P) in CAN2 has be terminated and the related backup call process CP2(B) in CAN3 has become the new primary call process CP2(P). No new traffic is directed to CP2(P) in CAN3. Also, the backup call process CP3(B) has been moved to CAN3.

Figure 5F:
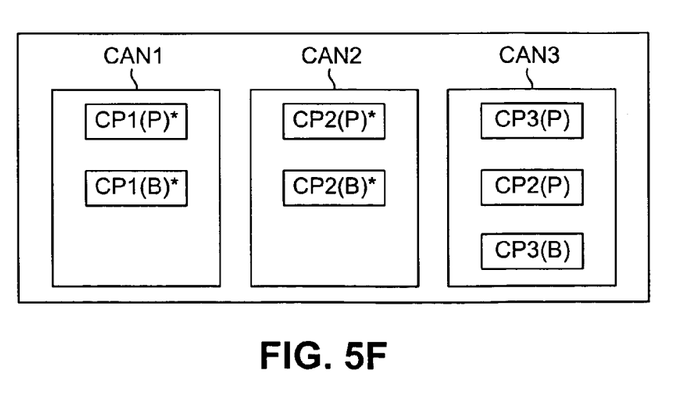

In FIG. 5F, new updated primary call process CP2(P)* has been installed in CAN2 and new updated backup call process CP2(B)* has been created in CAN2. New call traffic can now be directed to primary call process CP2(P)* in increasing increments until new updated primary-backup group call process server application CP2* is fully functional.

Figure 5G:
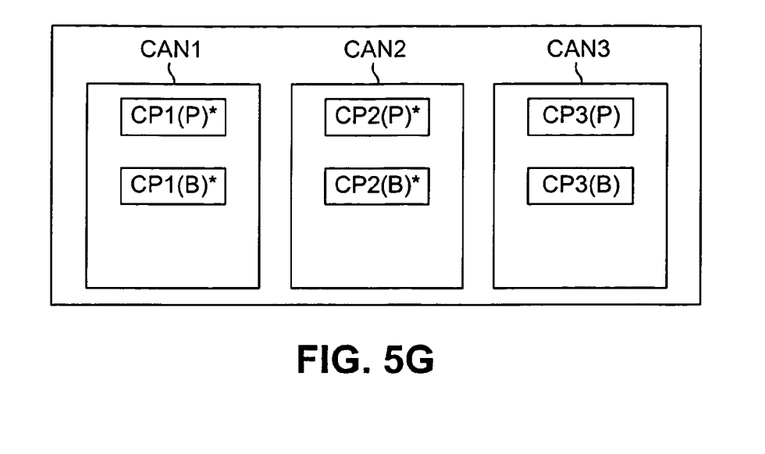

In FIG. 5G, the old call process CP2(P) in CAN3 has finally shut down through termination of all existing calls.

Figure 5H:
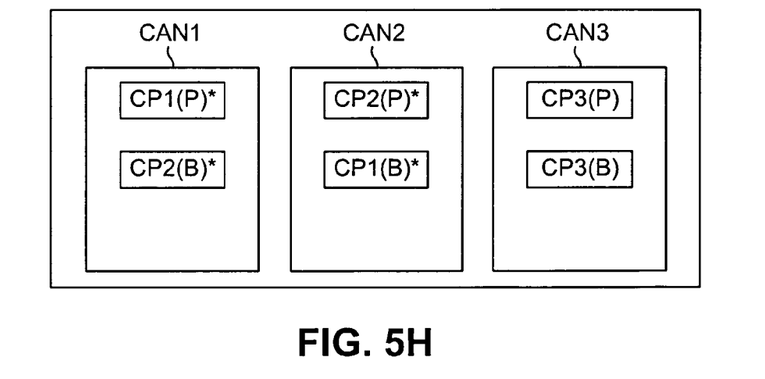

In FIG. 5H, the backup call processes CP1(B)* and CP2(B)* switch locations in CAN1 and CAN2.

Figure 5I:
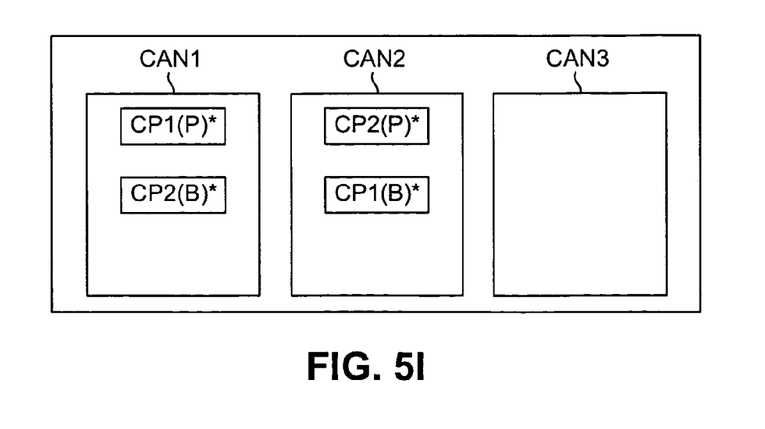

In FIG. 5I, primary call process CP3(P) in CAN3 has been starved for new calls by leaving the load sharing group. The primary call process CP3(P) and its associated backup process CP3(B) have been terminated after all existing call traffic ended.

Figure 5J:
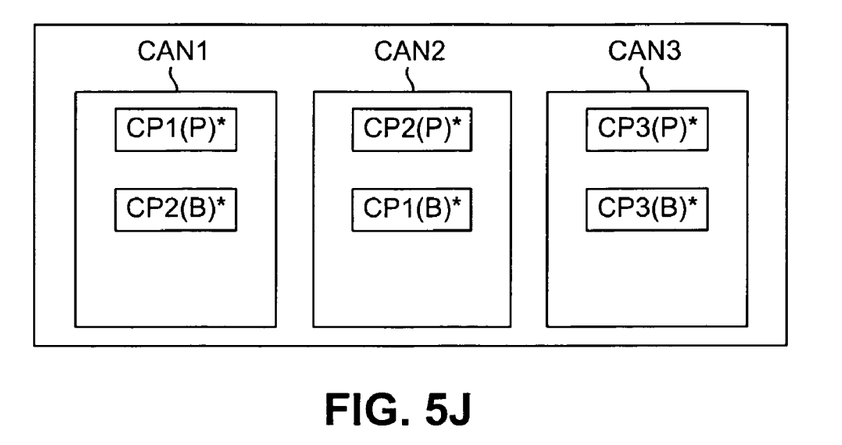

In FIG. 5J, new updated primary call process CP3(P)* has been installed in CAN3 and new updated backup call process CP3(B)* has been created in CAN3. New call traffic can now be directed to primary call process CP3(P)* in increasing increments until new updated primary-backup group call process server application CP3* is fully functional.

Figure 5K:
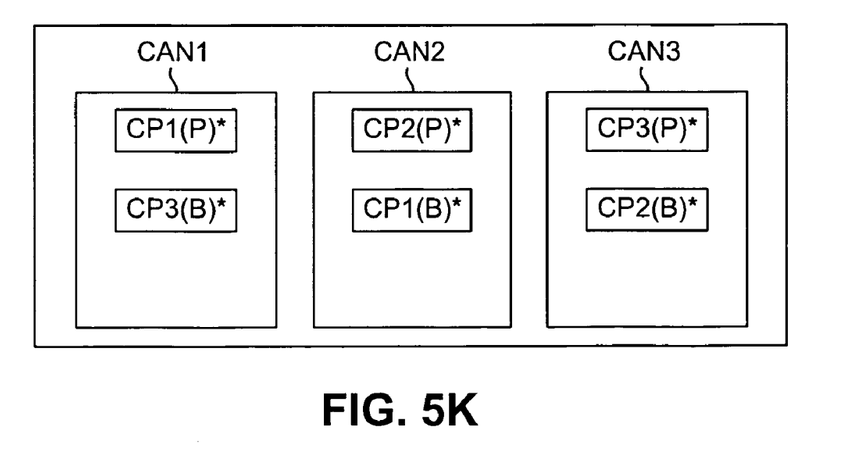

In FIG. 5K, the locations of backup call processes CP1(B)*, CP2(B)*, and CP3(B)* have been rotated in CAN1, CAN2, and CAN3 to achieve the original configuration illustrated in FIG. 5A.

Although the present invention has been described in detail, those skilled in the art should understand that they may make various changes, substitutions and alterations herein without departing from the spirit and scope of the invention in its broadest form.

What is claimed is:

1. For use in a switch comprising two or more call application nodes (CANs), a method of upgrading a plurality of call process server applications, wherein each of the call process server applications comprises a primary call process and a backup call process executed on different ones of the two or more CANs, the method comprising the steps of:

receiving a shutdown command operable on a first call process server application comprising a first primary call process executed on a first CAN and a first backup call process executed on a second CAN;

in response to receipt of the shutdown command, disabling the first primary call process such that no future call traffic associated with the first call process server application is directed to the first primary call process on the first CAN;

re-designating the first backup call process as a new primary call process of the first call process server application such that all future call traffic associated with pre-existing calls handled by the first call process server application is directed to the re-designated first backup call process on the second CAN;

moving a second backup call process, if any, associated with a second call process server application and resident on the first CAN to a different CAN; and installing an upgraded first call process server application on the first CAN, such that an upgraded first primary call process of the upgraded first call process server application executes on the first CAN and creates on the first CAN an upgraded first backup call process of the upgraded first call process server application.

2. The method as set forth in claim 1 further comprising the step of removing the disabled first primary call process from the first CAN.

3. The method as set forth in claim 2 further comprising the step of preventing future call traffic associated with new calls from being directed to the re-designated first backup call process.

4. The method as set forth in claim 3 further comprising the step of removing the re-designated first backup call process from the second CAN when all pre-existing calls are terminated.

5. The method as set forth in claim 1 wherein the upgraded first primary call process joins a first load sharing group server application comprising call process server applications similar to the upgraded first call process server application.

6. The method as set forth in claim 5 wherein the first load sharing group server application directs new call traffic associated with new calls to the upgraded first primary call process under control of a throttling mechanism.

7. The method as set forth in claim 6 wherein the throttling mechanism initially causes relatively small amounts of new call traffic to be directed to the upgraded first primary call process.

8. The method as set forth in claim 7 wherein the throttling mechanism causes gradually increasing amounts of new call traffic to be directed to the upgraded first primary call process.

9. The method as set forth in claim 1 wherein said received shutdown command is automatically generated by said switch.

10. The method as set forth in claim 1 wherein said received shutdown command is generated by an operator of said switch.

11. A telecommunication switch comprising:

two or more call application nodes (CANs) capable of executing a plurality of call process server applications, wherein each of the call process server applications comprises a primary call process and a backup call process executed on different ones of the two or more CANs, wherein the switch executes an upgrade process capable of upgrading said plurality of call process server applications, said upgrade process comprising:

receiving a shutdown command operable on a first call process server application comprising a first primary call process executed on a first CAN and a first backup call process executed on a second CAN;

in response to receipt of the shutdown command, disabling the first primary call process such that no future call traffic associated with the first call process server application is directed to the first primary call process on the first CAN;

re-designating the first backup call process as a new primary call process of the first call process server application such that all future call traffic associated with pre-existing calls handled by the first call process server application is directed to the re-designated first backup call process on the second CAN;

moving a second backup call process, if any, associated with a second call process server application and resident on the first CAN to a different CAN; and installing an upgraded first call process server application on the first CAN, such that an upgraded first primary call process of the upgraded first call process server application executes on the first CAN and creates on the first CAN an upgraded first backup call process of the upgraded first call process server application.

12. The telecommunication switch as set forth in claim 11 wherein the upgrade process further comprises removing the disabled first primary call process from the first CAN.

13. The telecommunication switch as set forth in claim 12 wherein the upgrade process further comprises preventing future call traffic associated with new calls from being directed to the re-designated first backup call process.

14. The telecommunication switch as set forth in claim 13 wherein the upgrade process further comprises removing the re-designated first backup call process from the second CAN when all pre-existing calls are terminated.

15. The telecommunication switch as set forth in claim 11 wherein the upgraded first primary call process joins a first load sharing group server application comprising call process server applications similar to the upgraded first call process server application.

16. The telecommunication switch as set forth in claim 15 wherein the first load sharing group server application directs new call traffic associated with new calls to the upgraded first primary call process under control of a throttling mechanism.

17. The telecommunication switch as set forth in claim 16 wherein the throttling mechanism initially causes relatively small amounts of new call traffic to be directed to the upgraded first primary call process.

18. The telecommunication switch as set forth in claim 17 wherein the throttling mechanism causes gradually increasing amounts of new call traffic to be directed to the upgraded first primary call process.

19. The telecommunication switch as set forth in claim 11 wherein said received shutdown command is automatically generated by said switch.

20. The telecommunication switch as set forth in claim 11 wherein said received shutdown command is generated by an operator of said switch.

* * * * *